(12) United States Patent
Rothschild et al.

(10) Patent No.: US 11,247,611 B2
(45) Date of Patent: Feb. 15, 2022

(54) VEHICLE DOOR MIRROR ASSEMBLY

(71) Applicant: Honda Motor Co., Ltd., Tokyo (JP)

(72) Inventors: Jacob A. Rothschild, Marysville, OH (US); Oscar A. Caraan, Delaware, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 175 days.

(21) Appl. No.: 16/529,004

(22) Filed: Aug. 1, 2019

(65) Prior Publication Data

US 2021/0031690 A1    Feb. 4, 2021

(51) Int. Cl.
*B60R 1/062*    (2006.01)

(52) U.S. Cl.
CPC .................... *B60R 1/062* (2013.01)

(58) Field of Classification Search
CPC ............... B60R 1/062; B60R 1/074
USPC .................................. 359/841, 872
See application file for complete search history.

(56) References Cited

U.S. PATENT DOCUMENTS

| 3,229,581 | A | * | 1/1966 | Walter | B60R 1/064 |
| | | | | | 359/872 |
| 4,514,060 | A | | 4/1985 | Mittelhauser | |
| 4,701,037 | A | * | 10/1987 | Bramer | B60R 1/068 |
| | | | | | 248/481 |
| 4,991,950 | A | | 2/1991 | Lang et al. | |
| 6,059,419 | A | * | 5/2000 | Englander | B60R 1/0605 |
| | | | | | 248/479 |
| 7,152,986 | B2 | * | 12/2006 | Schuurmans | B60R 1/06 |
| | | | | | 359/879 |
| 10,099,618 | B2 | * | 10/2018 | Foote | B60R 1/076 |
| 10,589,683 | B2 | * | 3/2020 | Bortolon | B60R 1/072 |
| 2006/0285236 | A1 | * | 12/2006 | Huprikar | B60R 1/076 |
| | | | | | 359/879 |
| 2009/0279195 | A1 | * | 11/2009 | Itoh | B60R 1/074 |
| | | | | | 359/872 |
| 2019/0176706 | A1 | * | 6/2019 | Hamada | A47G 1/16 |
| 2019/0193636 | A1 | * | 6/2019 | Sawada | F16J 15/3204 |
| 2019/0315277 | A1 | * | 10/2019 | Sawada | B60R 1/062 |
| 2020/0353867 | A1 | * | 11/2020 | Huizen | B60R 1/1207 |
| 2021/0023999 | A1 | * | 1/2021 | Rothschild | B60R 1/06 |

FOREIGN PATENT DOCUMENTS

| CN | 205417375 | 8/2016 |
| CN | 206426937 | 8/2017 |
| CN | 109017576 | 12/2018 |
| JP | 2013001192 | 1/2013 |
| WO | 2018131540 | 7/2018 |
| WO | 2019040711 | 2/2019 |

* cited by examiner

*Primary Examiner* — Ricky D Shafer
(74) *Attorney, Agent, or Firm* — Rankin, Hill & Clark LLP

(57) ABSTRACT

An external mirror assembly for a vehicle includes a support arm adapted to be affixed to an associated vehicle side door, and a housing movably mounted to the support arm. A glass assembly is secured to the housing. A flexible deflector is mounted to the housing and surrounding a portion of the support arm received in the housing. The deflector has a stepped configuration allowing for stretching of the deflector as the housing is moved relative to the support arm and to reduce wind noise through a gap between the support arm portion and the housing.

18 Claims, 4 Drawing Sheets

VEHICLE DOOR MIRROR ASSEMBLY

BACKGROUND

A known mirror assembly for a vehicle side door generally includes a glass assembly mounted to a housing of the mirror assembly. The glass assembly includes a mirror backing plate that is snapped onto an adapter plate housed in the housing. The adapter plate is connected to an actuator which allows the user to adjust the position of the mirror by rotating the adapter plate while the remaining mirror components are stationary. The glass assembly is typically recessed into the housing to protect the glass assembly from impacts or from becoming disconnected from the adapter plate. Typically, the housing is adapted to pivot or fold forward or rearward and a joint or cutline between the housing and a base allows for this movement. A seal member is provided in the joint to prevent wind noise; however, the seal member can resist the folding motion of the housing. For a frameless type mirror assembly, the glass assembly is extended out to be flush with a peripheral edge of the housing to give a frameless/seamless appearance. Because the glass assembly is attached to the housing, the housing pivots together with the glass assembly when the glass assembly is adjusted for visibility. Typically, the housing pivots around a fixed support arm or base, and this requires a clearance hole in an underside of the housing around the portion of the base that extends into the housing. The clearance hole allows the housing to rotate freely relative to the base; however, the clearance hole also allows for wind noise and water and dirt intrusion into the housing.

BRIEF DESCRIPTION

According to one aspect, an external mirror assembly for a vehicle comprises a support arm adapted to be affixed to an associated vehicle side door, and a housing movably mounted to the support arm. A glass assembly is secured to the housing. A flexible deflector is mounted to the housing and surrounds a portion of the support arm received in the housing. The deflector has a stepped configuration allowing for stretching of the deflector as the housing is moved relative to the support arm and to reduce wind noise through a gap between the support arm portion and the housing.

According to another aspect, an external mirror assembly for a vehicle comprises a support arm adapted to be affixed to an associated vehicle side door, and a housing movably mounted to the support arm. A glass assembly is secured to the housing with a peripheral edge of the glass assembly substantially flush with a peripheral edge of the housing. The housing and glass assembly together and in tandem are movable relative to the support arm in an up-and-down direction or a side-to-side direction to adjust a field of view of the glass assembly as viewed by an associated vehicle operator. A flexible deflector is mounted to the housing and surrounds a portion of the support arm received in the housing. The deflector extends into a space between the housing and the support arm portion. The deflector is configured so that during movement in the up-and-down direction or the side-to-side direction one side of the deflector is in direct contact with the support arm portion and an opposite side of the deflector is spaced from the support arm portion to define a gap between the deflector and the support arm portion.

According to another aspect, an external mirror assembly for a vehicle comprises a support arm adapted to be affixed to an associated vehicle side door, and a housing movably mounted to the support arm. A glass assembly is secured to the housing with a peripheral edge of the glass assembly substantially flush with a peripheral edge of the housing. The housing and glass assembly together and in tandem are movable relative to the support arm in an up-and-down direction or a side-to-side direction to adjust a field of view of the glass assembly as viewed by an associated vehicle operator. A flexible deflector is mounted to the housing and surrounds a portion of the support arm received in the housing. The deflector extends into a space between the housing and the support arm portion. The deflector is configured so that during movement in the up-and-down direction or the side-to-side direction one side of the deflector is in direct contact with the support arm portion and an opposite side of the deflector is spaced from the support arm portion to define a gap between the deflector and the support arm portion. The deflector has a stepped configuration allowing for stretching of the deflector as the housing is moved relative to the support arm and to reduce wind noise through the space between the housing and the support arm portion.

DETAILED DESCRIPTION

Figure 1:
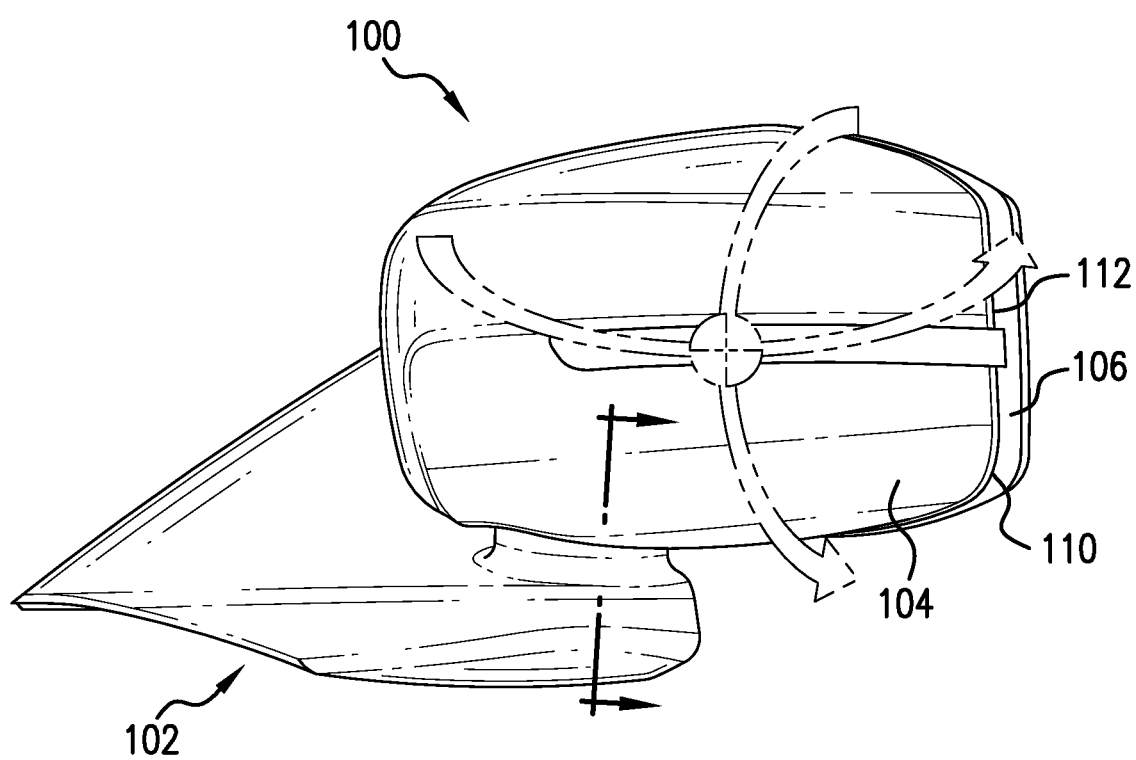
FIG. 1 is a front perspective view of an exemplary external mirror assembly for a vehicle according to the present disclosure.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIGS. 1 and 3-6 illustrate an exemplary external mirror assembly 100 for an associated vehicle according to the present disclosure. The mirror assembly 100 is attached to a base or support arm 102 adapted to be affixed to an associated vehicle side door, specifically to a forward side of an associated front door. The mirror assembly 100 generally includes a housing 104 movably mounted to the support arm and a glass assembly 106 attached to the housing 104. The depicted mirror assembly 100 is configured to have a frameless appearance. Specifically, a housing peripheral edge 110 of the housing 104 and a mirror peripheral edge 112 of the glass assembly 106 are sized and aligned to be flush with each other. Thus, when looking normal to the glass assembly 106, the housing 104 does not extend around any edge of the glass assembly 106, but instead is disposed behind the glass assembly.

As shown, an adapter plate 116 for a glass actuator 118 is attached to and disposed within the housing 104 for attachment of the glass assembly 106, thereby serving to secure the glass assembly 106 to the housing 104. According to one aspect, the glass assembly 106 includes a mirror 122 defined by a reflective glass plate; however, other materials having reflective surfaces may also be implemented as the mirror 122. Furthermore, the mirror 122 may be flat or may alternatively have a contoured surface so as to be convex or concave. The mirror 122 is affixed to a mirror backing plate 124 which, in turn, is affixed to the adapter plate 116 thereby securing the glass assembly 106 to the housing 104. In order to form a frameless look, the mirror backing plate 124 is extended to become a visible surface of the mirror assembly 100. As is known, the adapter plate 116 can be a full width adapter plate with a profile that substantially matches profiles of the housing 104 and the glass assembly 106 and allows for the attachment of the housing and for the glass assembly. By way of example, the adapter plate 116 can include adapter clips to hold the adapter plate against the glass actuator 118 and against the mirror backing plate 124. A power fold actuator 120 is mounted or attached within the housing 104 by a bracket 126. The bracket 126 is connected to a pivoting structure 130 that pivotally mounts to a support arm portion or base portion 132 of the support arm 102.

It should be appreciated that movement of the housing 104 and glass assembly 106 together and in tandem relative to the support arm 102 (via the glass actuator 118) adjusts a rearward field of view of the mirror 122 as viewed by an associated vehicle operator (i.e., the driver of the vehicle). The glass actuator 118 can include any known mechanical arrangement to facilitate both vertical (i.e., up and down) and horizontal (i.e., side-to-side) adjustment of the housing 104 relative to the support arm 102. It should also be appreciated that the power fold actuator 120 is operable to move (via the pivoting structure 130) the housing 104 relative to the support arm 102 between a retraction position, in which the mirror 122 faces a side of the vehicle, and a use position, in which the mirror 122 faces in the rear direction of the vehicle. Further, the glass actuator 118 and the power fold actuator 120 can be directly or indirectly actuated mechanically or electrically via, for example, interior switches within the vehicle interior.

As shown in FIGS. 3-6, the base portion 132 of the support arm 102 is received through or disposed at an opening 140 on an underside 142 of the housing 104. The opening 140 is sized to provide a clearance or a gap between the base portion 132 and the housing 104 to allow for adjustment of the housing 104 relative to the base portion 132, without direct contact between the housing 104 and the base portion 132 during adjustment of the mirror assembly 100. A gasket or seal member or deflector 150 is secured to an inner surface 152 of the housing 104 and is at least partially mounted within the opening 140. The deflector 150 surrounds the base portion 132 and generally closes over the opening 140 to limit water or dirt intrusion into the housing 104. The deflector 150 is formed of a flexible material and is designed to allow for unrestricted movement of the housing 104 relative to the base portion 132. The deflector 150 further has a stepped configuration to reduce wind noise through the gap between the base portion 132 and the housing 104.

Figure 2:
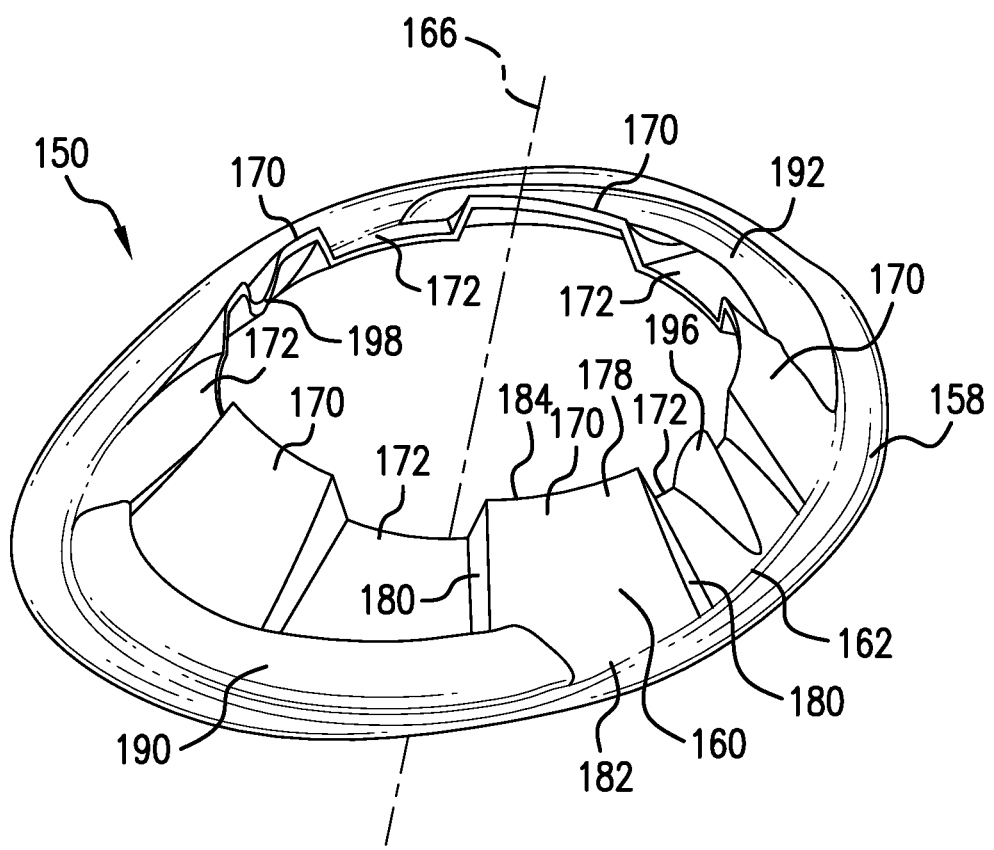
FIG. 2 is a perspective view of an exemplary deflector for the external mirror assembly.
Figure 4:
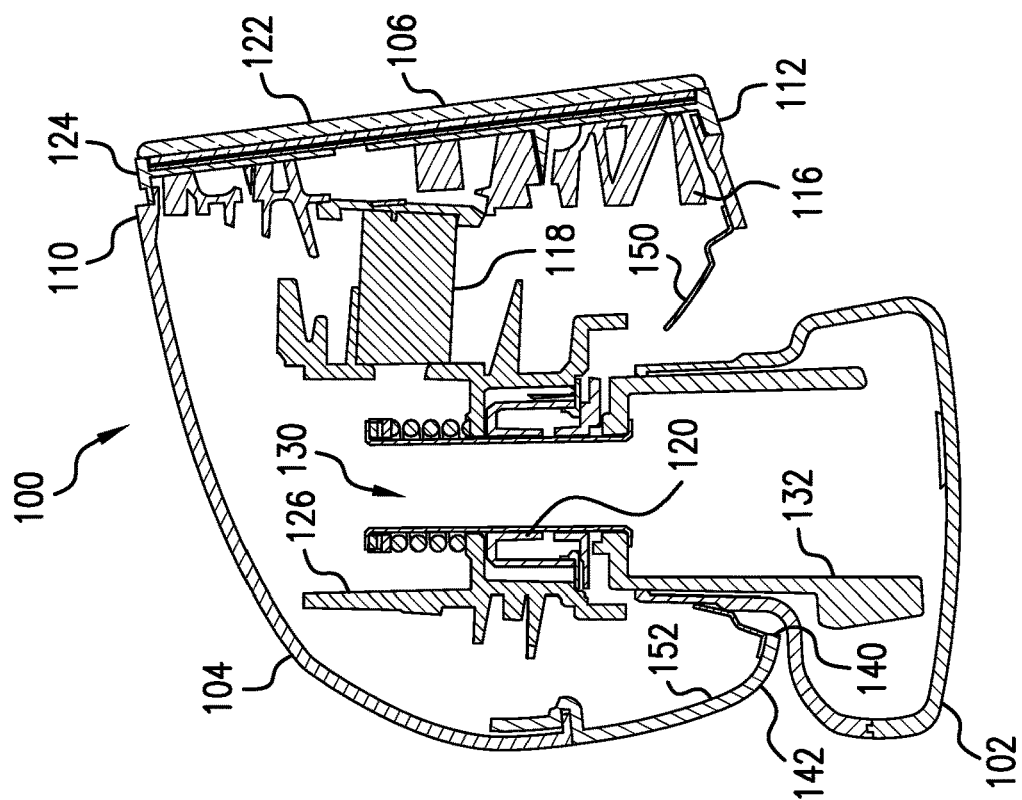
FIGS. 3 and 4 are cross-sectional views of the external mirror assembly in respective rotated up and rotated down positions.
Figure 3:
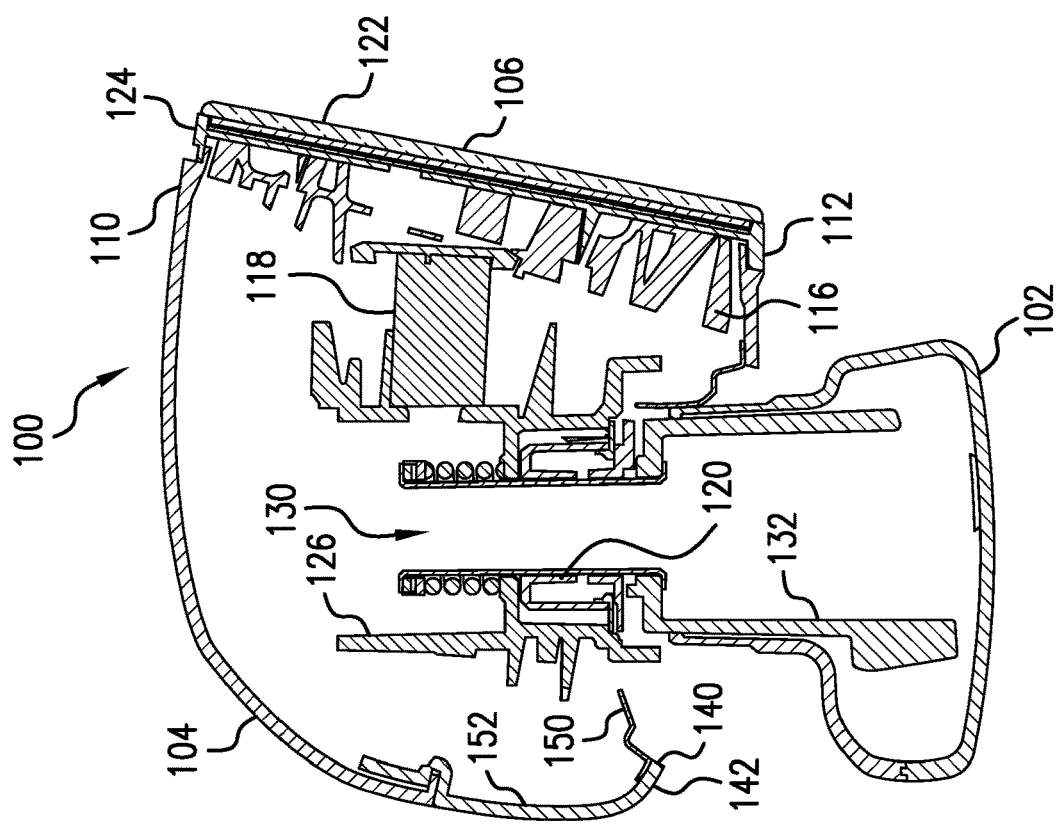

The features of the exemplary deflector 150 are best depicted in FIG. 2, The deflector 150 includes an annular flange 158 to be secured to the inner surface 152 of the housing 104. The flange 158 defines an opening for the base portion 132. A sidewall 160 extends from an inner peripheral edge portion 162 of the flange 158, and according to one aspect, the sidewall 160 extends from the flange 158 in a converging manner toward a longitudinal axis 166 defined by the deflector. As illustrated, with the converging shape of the sidewall 160, the deflector 150 can be substantially frustoconical shaped in side view. The sidewall 160 which has the stepped configuration includes a plurality of stepped portions 170 interconnected by a plurality of webs 172. The stepped portions 170 are angularly spaced from one another relative to the longitudinal axis 166 of the deflector 150. Each of the stepped portions 170 includes a base section 178 and side sections 180 which interconnect adjacent webs 172 with the base section 178. The side sections 180 can have an increasing height dimension from one edge 182 of the base section 178 (i.e., the edge connected to the flange 158) to an opposite edge 184 of the base section. Therefore, each of the stepped portions 170 can be substantially ramp shaped in side view. Further, fillets can be provided between the stepped portions 170 and webs 172 to provide a gradual transition between these features.

With continued reference to FIG. 2, the sidewall 160 includes at least one raised ridge that extends along the inner peripheral edge portion 162 of the flange 158. The at least one ridge provides additional material for the sidewall 160 which allows for stretching of the sidewall 160 as the housing 104 together with the glass assembly 106 are moved relative to the support arm 102. In the depicted aspect, the at least one ridge includes a first ridge 190, and the sidewall 160 includes a second ridge 192 that extends along the inner peripheral edge portion 162 of the flange 158. The first and second ridges 190, 192 are located on opposite sides of the flange 158, and each of the first and second ridges 190, 192 can be sized to span across at least one stepped portion and at least one adjoining web. Further, at least one web 172 can include a folded portion 196 which also provides additional material for the sidewall 160 to allow for stretching of the at least one web as the housing 104 together with the glass assembly 106 are moved relative to the support arm 102. In the illustrated embodiment, at least one stepped portion 170, which can be located on an opposite side of the flange 158 from the at least one web 172 having the folded portion 196, can include a folded portion 198. As depicted, one of the folded portions (i.e., folded portion 196) is raised and the other of the folded portions (i.e., folded portion 198) is depressed; although, this is not required. Further, it should be appreciated that more than the depicted one web 172 can include the folded portion 196. For example, it is contemplated that immediately adjacent webs 170, every other web 172, or each of the webs 172 can include the folded portion 196. It should also be appreciated that more than the depicted one stepped portion 170 can include the folded portion 198. For example, it is contemplated that immediately adjacent stepped portions 170, every other stepped portion 170, or each of the stepped portions 170 can include the folded portion 198.

The exemplary deflector 150 includes several features, namely, the stepped portions 170, the webs 172, the expanding ridges 190, 192, and the expanding folded portions 196, 198. It should be appreciated that the deflector 150 can have any number and combination of these features. By way of example, in the depicted aspect, the sidewall 160 of the deflector 150 includes five stepped portions 170 and five webs 172; however, more or less than the depicted number can be provided for the deflector 150. Further, the deflector 150 may not include the ridges 190, 192 and/or the folded portions 196, 198. However, the deflector 150 can include more than the depicted two ridges 190, 192, and as indicated above, additional folded portions 196, 198 can be provided.

Figure 5:
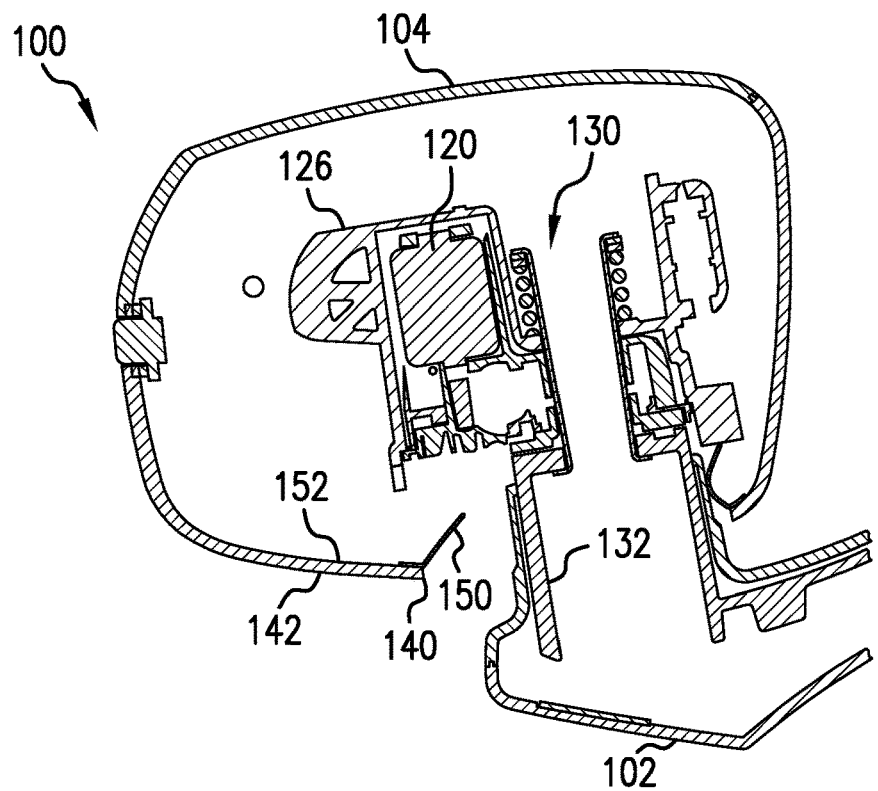
FIGS. 5 and 6 are cross-sectional views of the external mirror assembly in respective rotated in and rotated out positions.
Figure 6:
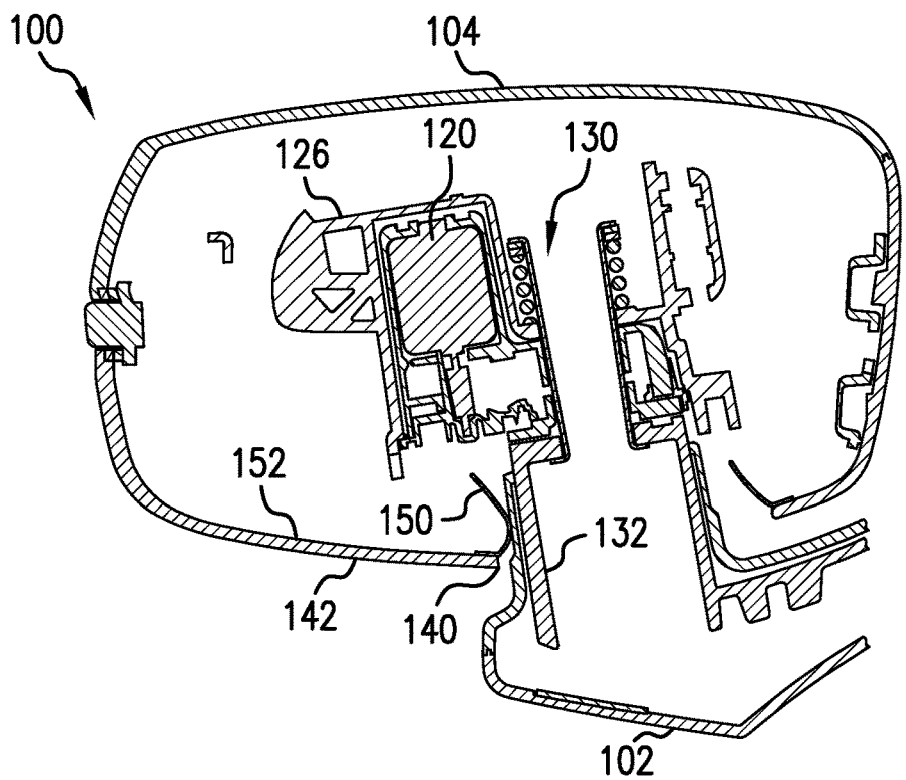

With reference to FIGS. 3-6, the deflector 150 is configured so that during movement in the up-and-down direction or the side-to-side direction of the mirror assembly 100 one side of the deflector 150 is in direct contact with the base portion 132 of the support arm 102 and an opposite side of the deflector is spaced from the base portion to define a gap between the deflector 150 and the base portion to allow for unrestricted movement of the mirror assembly 100. More particular, in FIGS. 3 and 4, the housing 104 and glass assembly 106 together and in tandem are moved relative to the support arm 102 in an up-and-down direction. During movement in the up-and-down direction one side of the deflector 150 is in direct contact with the base portion 132 and an opposite side of the deflector 150 is spaced from the base portion 132 to define a gap between the deflector and the base portion 132. In FIGS. 5 and 6, the housing 104 and glass assembly 106 together and in tandem are moved relative to the support arm in a side-to-side direction. During movement in the side-to-side direction one side of the deflector 150 is in direct contact with the base portion 132 and an opposite side of the deflector 150 is spaced from the support arm portion to define a gap between the deflector and the base portion 132.

As is evident from the foregoing, the clearance opening 140 defined in the underside 142 of the housing 104 for the base portion 132 of the support arm 102 is addressed by the deflector 150 secured to the inner surface 152 of the housing 104. The deflector 150 surrounds the base portion 132 and is compliant to reduce resistance to operation of the glass actuator 118. Regardless of the position of the housing 104, the deflector 150 both contacts the base portion 132 and extend freely into the gap between the housing 104 and base portion 132. The shape of the deflector 150 including the stepped portions 170 and interconnecting webs 172 together with the extra material (provided by the first and second ridges 190, 192 and folded portions 196, 198) allows the deflector 150 to flex and stretch as needed while minimizing the gap between the housing 104 and base portion 132. Accordingly, the exemplary deflector 150 is adapted to block wind from entering the housing 104 and creating noise. Removing wind noise is important for door mirror assemblies from a marketability perspective and the deflector 150 is adapted to prevent wind noise at all positions of the mirror assembly 100 relative to the support arm 102. The deflector 150 further blocks debris and water from entering the housing 104 by covering the majority of the opening 140 so that there is no longer a large opening vulnerability. The deflector 150 also provides a finished appearance over the opening 140. The deflector 150 is further adapted to minimize resistance to movement of the housing 104 relative to the support arm 102. By way of example, when the mirror assembly 100 is folded into the vehicle via the power fold actuator 120, the deflector 150 provides minimal resistance to the movement of the housing 104. Further, although the exemplary deflector 150 is described as part of the depicted frameless mirror assembly 100, it should be appreciated that the exemplary deflector 100 can be used with alternative mirror assembly configurations, such as a thin bezel mirror assembly.

It will be appreciated that the above-disclosed features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An external mirror assembly for a vehicle comprising:
a support arm adapted to be affixed to an associated vehicle side door;
a housing movably mounted to the support arm;
a glass assembly secured to the housing; and
a flexible deflector mounted to the housing and surrounding a portion of the support arm received in the housing, a sidewall of the deflector having a stepped configuration allowing for stretching of the deflector as the housing is moved relative to the support arm and to reduce wind noise through a gap between the support arm portion and the housing, wherein the sidewall includes a plurality of stepped portions interconnected by a plurality of webs, the stepped portions are circumferentially spaced from one another relative to a longitudinal axis defined by the deflector,
wherein the deflector includes an annular flange, and the sidewall includes at least one raised ridge that extends along the inner peripheral edge portion of the annular flange, the at least one ridge allowing for stretching of the sidewall as the housing is moved relative to the support arm.

2. The mirror assembly of claim 1, wherein the deflector is received within an opening in an underside of the housing through which the support arm portion is received, the deflector being secured to an inner surface of the housing.

3. The mirror assembly of claim 2, wherein the annular flange is secured to the inner surface of the housing, the flange defines an opening for the support arm portion, and the sidewall extends from an inner peripheral edge portion of the flange.

4. The mirror assembly of claim 3, wherein the sidewall extends from the flange in a converging manner toward the longitudinal axis defined by the deflector.

5. The mirror assembly of claim 3, wherein the housing and glass assembly together and in tandem are movable relative to the support arm in an up-and-down direction to adjust a field of view of the glass assembly as viewed by an associated vehicle operator, wherein during movement in the up-and-down direction one side of the deflector is in direct contact with the support arm portion and an opposite side of the deflector is spaced from the support arm portion to define a gap between the deflector and the support arm portion.

6. The mirror assembly of claim 3, wherein the housing and glass assembly together and in tandem are movable relative to the support arm in a side-to-side direction to adjust a field of view of the glass assembly as viewed by an associated vehicle operator, wherein during movement in the side-to-side direction one side of the deflector is in direct contact with the support arm portion and an opposite side of the deflector is spaced from the support arm portion to define a gap between the deflector and the support arm portion.

7. The mirror assembly of claim 1, wherein the at least one ridge includes a first ridge, and the sidewall includes a second ridge that extends along the inner peripheral edge portion of the flange, the first and second ribs located on opposite sides of the flange.

8. The mirror assembly of claim 1, wherein at least one web includes a folded portion to allow for stretching of the at least one web as the housing is moved relative to the support arm.

9. The mirror assembly of claim 1, wherein at least one stepped portion includes a folded portion to allow for stretching of the at least one stepped portion as the housing is moved relative to the support arm.

10. An external mirror assembly for a vehicle comprising:
a support arm adapted to be affixed to an associated vehicle side door;
a housing movably mounted to the support arm;
a glass assembly secured to the housing with a peripheral edge of the glass assembly substantially flush with a peripheral edge of the housing, wherein the housing and glass assembly together and in tandem are movable relative to the support arm in an up-and-down direction or a side-to-side direction to adjust a field of view of the glass assembly as viewed by an associated vehicle operator; and a flexible deflector mounted to the housing and surrounding a portion of the support arm received in the housing, the deflector extends into a space between the housing and the support arm portion, wherein the deflector is configured so that during movement in the up-and-down direction or the side-to-side direction one side of the deflector is in direct contact with the support arm portion and an opposite side of the deflector is spaced from the support arm portion to define a gap between the deflector and the support arm portion.

11. The mirror assembly of claim 10, wherein the deflector has a stepped configuration allowing for stretching of the deflector as the housing is moved relative to the support arm and to reduce wind noise through the space between the housing and the support arm portion.

12. The mirror assembly of claim 11, wherein the deflector includes an annular flange secured to an inner surface of the housing, the flange defines an opening for the support arm portion, and an annular sidewall extends from the flange, the sidewall has the stepped configuration.

13. The mirror assembly of claim 12, wherein the sidewall includes a plurality of stepped portions interconnected by a plurality of webs.

14. The mirror assembly of claim 13, wherein the sidewall includes at least one ridge that extends along an inner peripheral edge portion of the flange, the at least one ridge allowing for stretching of the sidewall as the housing is moved relative to the support arm.

15. The mirror assembly of claim 13, wherein at least one web includes a folded portion to allow for stretching of the at least one web as the housing is moved relative to the support arm.

16. The mirror assembly of claim 13, wherein at least one stepped portion includes a folded portion to allow for stretching of the at least one stepped portion as the housing is moved relative to the support arm.

17. An external mirror assembly for a vehicle comprising:
a support arm adapted to be affixed to an associated vehicle side door;
a housing movably mounted to the support arm;
a glass assembly secured to the housing with a peripheral edge of the glass assembly substantially flush with a peripheral edge of the housing, wherein the housing and glass assembly together and in tandem are movable relative to the support arm in an up-and-down direction or a side-to-side direction to adjust a field of view of the glass assembly as viewed by an associated vehicle operator; and
a flexible deflector mounted to the housing and surrounding a portion of the support arm received in the housing, the deflector extends into a space between the housing and the support arm portion,
wherein the deflector is configured so that during movement in the up-and-down direction or the side-to-side direction one side of the deflector is in direct contact with the support arm portion and an opposite side of the deflector is spaced from the support arm portion to define a gap between the deflector and the support arm portion,
wherein the deflector has a stepped configuration allowing for stretching of the deflector as the housing is moved relative to the support arm and to reduce wind noise through the space between the housing and the support arm portion.

18. The mirror assembly of claim 17, wherein the deflector includes an annular flange secured to an inner surface of the housing, the flange defines an opening for the support arm portion, and an annular sidewall extends from the flange, the sidewall includes a plurality of ramp shaped stepped portions interconnected by a plurality of webs.

* * * * *